US008803963B2

(12) United States Patent
Pulluru et al.

(10) Patent No.: US 8,803,963 B2
(45) Date of Patent: Aug. 12, 2014

(54) VEIN PATTERN RECOGNITION BASED BIOMETRIC SYSTEM AND METHODS THEREOF

(76) Inventors: Kranthi Kiran Pulluru, Indore (IN); Govind Agrawal, Indore (IN); Arti Agrawal, Indore (IN)

(*) Notice: Subject to any disclaimer, the term of this patent is extended or adjusted under 35 U.S.C. 154(b) by 440 days.

(21) Appl. No.: 13/120,081

(22) PCT Filed: Sep. 22, 2009

(86) PCT No.: PCT/IB2009/006915
§ 371 (c)(1),
(2), (4) Date: Mar. 21, 2011

(87) PCT Pub. No.: WO2010/032126
PCT Pub. Date: Mar. 25, 2010

(65) Prior Publication Data
US 2011/0169934 A1    Jul. 14, 2011

(30) Foreign Application Priority Data

Sep. 22, 2008   (IN) .......................... 02304/CHE/2008

(51) Int. Cl.
*G06K 9/00*       (2006.01)
*H04N 7/18*       (2006.01)

(52) U.S. Cl.
USPC ........................................... 348/77; 382/115

(58) Field of Classification Search
CPC ............... G06K 2009/00932; G06K 9/00006; G06K 9/00; H04N 7/18
USPC ........................................... 348/77; 382/115
See application file for complete search history.

(56) References Cited

U.S. PATENT DOCUMENTS

| | | | |
|---|---|---|---|
| 4,699,149 A | | 10/1987 | Rice |
| 5,787,185 A | * | 7/1998 | Clayden ........................ 382/115 |
| 6,301,375 B1 | * | 10/2001 | Choi ............................. 382/115 |
| 7,184,576 B2 | * | 2/2007 | Kono et al. ................... 382/115 |
| 7,323,633 B2 | * | 1/2008 | Shaffer ........................... 84/746 |
| 2002/0037100 A1 | * | 3/2002 | Toda et al. .................... 382/166 |
| 2002/0145507 A1 | * | 10/2002 | Foster .......................... 340/5.53 |
| 2005/0148876 A1 | * | 7/2005 | Endoh et al. .................. 600/454 |
| 2006/0034492 A1 | * | 2/2006 | Siegel et al. .................. 382/115 |
| 2006/0056700 A1 | * | 3/2006 | Abiko et al. .................. 382/190 |
| 2006/0122515 A1 | * | 6/2006 | Zeman et al. ................. 600/473 |

(Continued)

FOREIGN PATENT DOCUMENTS

| EP | 1 835 443 B1 | 12/2008 |
|---|---|---|
| WO | WO 88/04153 A1 | 6/1988 |
| WO | WO 2007/033380 A2 | 3/2007 |
| WO | WO 2008/054396 A1 | 5/2008 |

OTHER PUBLICATIONS

Huttenlocher et al., "Comparing Images Using the Hausdorff Distance." *IEEE Transactions on Pattern Analysis and Machine Intelligence*, 1993, vol. 15, No. 9, pp. 850-863.

(Continued)

*Primary Examiner* — Christopher S Kelley
*Assistant Examiner* — Deirdre Beasley
(74) *Attorney, Agent, or Firm* — Oliff PLC (57) ABSTRACT

Individual authentication techniques are disclosed, which relate to a vein recognition based to biometric authentication system. Systems and methods to capture the subcutaneous vein pattern at the back of the palm and use it as the biometric identity of an individual are also disclosed.

8 Claims, 11 Drawing Sheets

(56) References Cited

U.S. PATENT DOCUMENTS

| | | | | |
|---|---|---|---|---|
| 2006/0165261 | A1* | 7/2006 | Pira | 382/115 |
| 2007/0001879 | A1* | 1/2007 | Kaftan et al. | 341/79 |
| 2007/0058841 | A1* | 3/2007 | Miura et al. | 382/115 |
| 2007/0071291 | A1* | 3/2007 | Yumoto et al. | 382/124 |
| 2007/0172114 | A1* | 7/2007 | Baker et al. | 382/160 |
| 2007/0217660 | A1* | 9/2007 | Komura et al. | 382/115 |
| 2008/0002861 | A1* | 1/2008 | Yano et al. | 382/115 |
| 2008/0117409 | A1* | 5/2008 | Nagasaka et al. | 356/71 |
| 2008/0298642 | A1* | 12/2008 | Meenen | 382/115 |
| 2009/0123041 | A1* | 5/2009 | Tani | 382/126 |
| 2009/0184164 | A1* | 7/2009 | Sparks | 235/382 |
| 2011/0194776 | A1* | 8/2011 | Nakamura et al. | 382/195 |
| 2011/0247478 | A1* | 10/2011 | Shaffer | 84/464 R |
| 2011/0274318 | A1* | 11/2011 | Shindo et al. | 382/115 |
| 2012/0308088 | A1* | 12/2012 | Miura et al. | 382/115 |

OTHER PUBLICATIONS

Wang et al., "Infrared imaging of hand vein patterns for biometric purposes." *IET Comput. Vis.*, 2007, 1, (3-4), pp. 113-122, The Institution of Engineering and Technology.

Cross et al., "Thermographic Imaging of the Subcutaneous Vascular Network of the Back of the Hand for Biometric Identification." 1995, pp. 20-35, Australian Institute of Security and Applied Technology, Mount Lawley, Australia.

Wang et al., "Near- and Far-Infrared Imaging for Vein Pattern Biometrics." *Computer Society*, 2006, IEEE.

International Search Report issued International Application No. PCT/IB2009/006915 dated Mar. 22, 2011.

Written Opinion issued in International Application No. PCT/IB2009/006915 dated Mar. 22, 2011.

* cited by examiner

| 1 | 6,7 |
| 2 | 4,5 |
| 3 | 8,9 |

VEIN PATTERN RECOGNITION BASED BIOMETRIC SYSTEM AND METHODS THEREOF

TECHNICAL FIELD

The present disclosure generally relates to a biometric authentication techniques, particularly relates to a vein recognition based to biometric authentication system, more particularly, it relates to a system and methods to capture the subcutaneous vein pattern at the back of the palm and use it as the biometric identity of an individual.

BACKGROUND OF THE INVENTION AND PRIOR ART

A biometric system based on the recognition of veinous pattern on the palm or the back of the hand is generally a combination of the following modules and their operations U1. A Hand Placement and Detection Unit: the purpose of which is to detect the presence of a hand when the user places his hand on it in a certain manner. The detection unit informs the computer about the presence of a hand and prompts it for further processing.

U2. Illuminating and Imaging unit: The purpose of this unit is to illuminate the region of interest with uniformly diffused near-infrared light. The embodiment of the system is to be constructed such that it is not affected by the presence ambient light.

U3. Feature extraction unit: This unit extracts the essential information of the vascular pattern from the image captured by the imaging device. During registration this pattern is stored in a storage unit (hard-disk, smart card etc). During recognition, this pattern is compared to a stored pattern.

U4. Recognition unit: This unit compares two patterns, one obtained from the user (live pattern) and one from the storage database (recorded pattern) and makes a decision whether they belong to the same user.

With these modules in reference, we shall describe the previous (prior art) work, and their limitations in detail hereunder.

U1: Hand Placement Unit

The hand placement unit U1 should be able to restrict movement of the hand without causing any discomfort to the user. It should be designed in a manner as to ensure that the user intuitively places his hand consistently in the same position and angle. Prior art R2 describes a simple U-shaped hand docking unit which the user holds, while a camera snaps the image from above. R3 and R4 use a circular hand holding bar. R4 additionally uses a wrist pad to support the wrist on. These constructions ensure that the wrist is facing the camera, but they do not ensure that the user consistently places his hand in the same manner because there is enough leeway for movement and rotation of the hand and as shown in the figures.

Figure 1A:
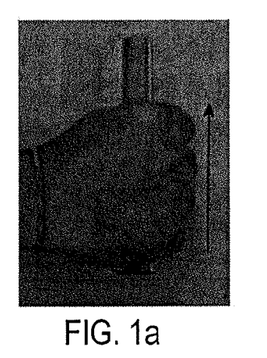
FIGS. 1a and 1b show circular hand holding bar with space for the hand to move in the direction of the arrow.
Figure 1B:
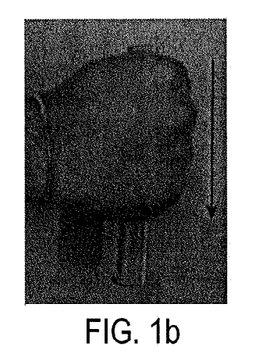
Figure 1C:
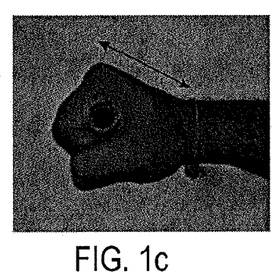
FIGS. 1c, 1d and 1e show circular hand holding bar with rotational freedom in the direction of arrow.
Figure 1D:
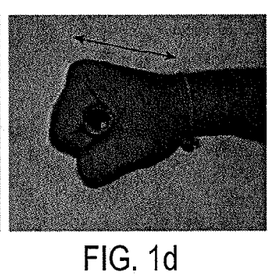
Figure 1E:
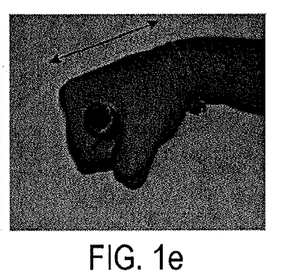
Figure 1F:
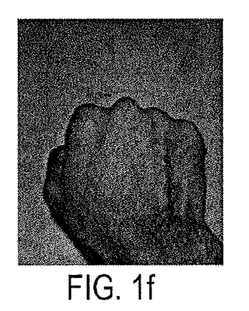
FIG. 1f shows that the surface of the back of the hand is flat when held in a gripping position

FIGS. 1a and 1b show that there is enough space for the hand to move it in the direction of the arrow. If the holding bar is made shorter to remove this freedom of movement, the system would become constricting and uncomfortable for a person with a larger hand. In FIGS. 1c, 1d and 1e the rotational freedom for the hand is demonstrated. A camera viewing from above would see the flat portion of the hand at different angles in the three cases.

Figure 1G:
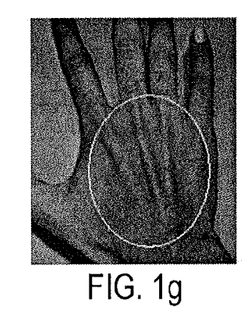
FIG. 1g shows that the metacarpal bones project out when the fingers are spread out.

The problem is not only of an image transformation but also of illumination, as the light reflected from the hand also changes in these situations. The portion of the hand that is away from the illuminating unit appears darker, and the portion which is closer appears brighter. These variations cause distortions in the resulting vein pattern. The design of hand placement in R5, R7 and R8 is such that the user spreads his hands when it is placed against the imaging device. It is observed that in slim hands when the hand is held in this manner, the metacarpal bones at the back of the hand project out as show in FIG. 1g.

This causes the resulting vein pattern to be distorted as the regions between the metacarpal bones appear darker than the neighboring region when observed under infrared radiation.

U2: Illuminating and Imaging

The design of the illuminating and imaging unit is based on the fact that highly diffused near infrared is absorbed by de-oxidized hemoglobin in the veins. This makes the vascular network appears darker compared to the neighboring tissue. The camera is selected and modified such that its spectral response of the imaging unit has a peak at this frequency. Prior art R2 specifies that after considerable experimentation with a variety of light sources including high intensity tungsten lights, it was necessary to irradiate the back of the hand using an IR cold source (LEDs). The entire prior art agree that the radiation has to be diffused and uniform on the surface of the hand. R8 mentions that room light can be used as infra-red source, but in an indoor environment during night there isn't sufficient IR that can be captured by a CCD camera. A cited patent in R8, US2006/0122515 describes a mechanism for obtaining diffused infrared for imaging vein patterns. The system employs a setup of multiple reflectors, diffusers and polarizers which makes the system bulky and hence non-portable. A low cost diffuser reduces the intensity of light making the image dull and increasing the intensity requires an array of LEDs which increase the cost of the device. Light correcting diffusers give better results but are expensive.

Figure 2A:
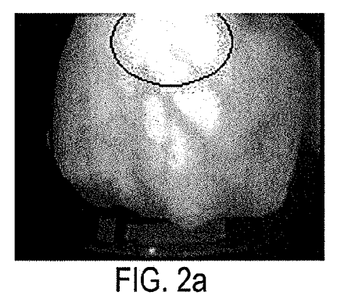
FIG. 2a shows the image of the back of the hand under an array of infrared LEDs and a diffuser.

FIG. 2a shows the Image of the back of the hand under an array of infrared LEDs and a diffuser. The portion inside the circle appears fully white because the light from this portion exceeds the upper cut-off of the camera due to specular reflection from the surface of the skin. In the language of signal processing, this phenomenon is called clipping.

R5 and R7 describe an iterative feedback based mechanism which based on readjusting the brightness of the LEDs based on the image observed by the computer. As specified in the patent R7 this step has to be repeated several times until an acceptable level of illumination uniformity is obtained. Such an iterative approach is time consuming. In a real life situation such delays lead to user annoyance.

U3: Feature Extraction

Figure 3A:
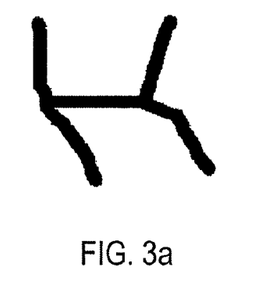
FIGS. 3a and 3b shows two different patterns having same branching characteristics.
Figure 3B:
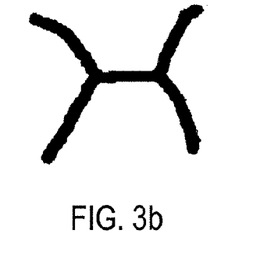

Almost all the prior work is based on converting the image of the vein pattern into a binary image and thinning it into a single pixel binary image. The problem with thinning is that vital information about the width of the veins is lost. Also the drawback of using a method based solely on the binarized image is that the directionality and continuity of the vein pattern are not fully exploited. A better approach would be to represent the vein pattern with geometric primitives such as points, line segments or splines. R4 specifies a
method in which the branching characteristics of the vascular network as used for comparison, but it is highly probable for vascular patterns of completely different shape to have the same branching characteristics. It is illustrated here in FIGS. 3a and 3b that two different patterns have the same branching characteristics.

Figure 4A:
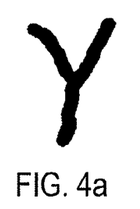
FIG. 4a shows a pattern representation in terms of line segments.
Figure 4B:
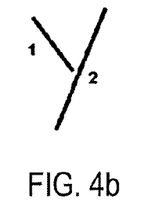
Figure 4C:
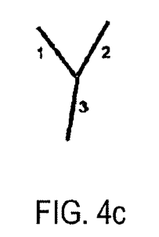

R6 employs a method in which the thinned vein pattern is represented in the form of line segments. The problem with such a method is there could be alternate representations of the same pattern in terms of line segments. For example the same pattern in FIG. 4a could have multiple interpretations in FIGS. 4b and 4c in terms of line segments.

U4: Recognition

In order to compare vein patterns, a distance function varying between 0 and 1 is defined. A distance function has a fundamental property that it is monotonic, in other words $$F(y,z) > F(y,x) \text{ if y has more resemblance to z than to x}$$

In R5, this distance function is defined as the number of matching vein pixels between the live image and the recorded image. In R7, this function is defined as (number of matching pixels)/(number of pixels in original image). In the examples shown below, pattern y matches with one arm of the pattern x. Pattern z is a copy of pattern y. From observation we would expect the distance between y and z to be much smaller than the distance between x and z.

It can be observed that the number of common pixels between the pair (x, y) is same as the number of common pixels between the pair (y, z), and hence according to the distance defined in R5 we would obtain F(y,z)=F(y,x) which is incorrect.

Using the method specified in R7

$$F(y, x) = \frac{\text{no. of common pixels in } (x, y)}{\text{no. of pixels in } y}$$

$$F(y, z) = \frac{\text{no. of common pixels in } (y, z)}{\text{no. of pixels in } y}$$

This would also result in F(y,z)=F(y,x) which is again incorrect.

These examples clearly suggest that a better definition for the distance measurement is needed.

R6 employs a method in which the thinned vein pattern is represented in the form of line segments and the line segment hausdorff distance (LSHD) is used for comparison. The problem with simple LSHD is that line segment representation of a pattern can be completely different for similar looking vein patterns. For example in FIG. 4 LSHD between these two representations of the same pattern would give a high value, as there is no corresponding segment in FIG. 4c for segment 2 in FIG. 4b.

REFERENCES

R1. U.S. Pat. No. 4,699,149—Joseph Rice
R2. Thermographic Imaging of the subcutaneous vascular network at the back of the hand for biometric identification—J. M. Cross and C. L. Smith
R3. U.S. Pat. No. 5,787,185—British Technology Group
R4. U.S. Pat. No. 6,301,375—Hwan-Soo Choi
R5. US20050148876—Fujitsu Limited
R6. Near and Far Infrared Imaging for Vein Pattern Biometrics—Wang Lingyu, Graham Leedham
R7. WO2007033380—Pira, Robert, K
R8. WO2008054396—Snowflake Techologies The shortcomings of the prior art are overcome and additional advantages are provided through the provision of a method and system as described in the present invention, and corresponding system.

OBJECTS OF THE INVENTION

An object of the invention is to eliminate the disadvantages in accordance with prior art.

Yet another object of the invention is to capture subcutaneous vein pattern at the back of the palm and use it as the biometric identity of a person.

Still another object of the present invention is to provide an imaging unit to capture an infra-red image of the back of the palm and optical arrangement for uniform lighting even in the presence of ambient light by exploiting the auto-iris effect of the camera.

Still another object of the present invention is to authenticate the individual by representing the vascular pattern as graph of line-segment-hypothesis.

Still another object of the present invention is to develop modified approach to the line-segment Hausdorff distance for computing distance between two different line-segment-hypotheses.

BRIEF DESCRIPTION OF ACCOMPANYING DRAWINGS

FIGS. 4b and 4c shows alternate representation of the pattern represented in FIG. 4a.

DETAILED DESCRIPTION OF THE INVENTION

In the following detailed description, reference is made to the accompanying drawings, which forms a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An illustrative embodiment provides vein pattern recognition based biometric system. The biometric system includes but not limited to a hand placement unit, and detection unit being configured to inform computing device about presence of a hand for processing; illuminating and imaging unit being configured to illuminate region of interest with uniformly diffused near-infrared light; feature extraction unit being adopted to extract appropriate information of the vascular pattern from image captured by the imaging device; and recognition unit being configured to compare plurality of patterns and to make authentication.

According to another aspect of the embodiments, the system is configured to capture subcutaneous vein pattern at the back of the palm and the hand placement unit comprises portion to rest flat portion of the palm (H1), plurality of buttons (H2 and H3) to be pressed by thumb being configured to indicate left or right hand has been placed, portion (concavity) to rest fleshy part of the palm (H4), portion to guide the wrist for alignment (H5) and protrusion (H6) being adopted to separate middle finger and ring finger.

According to another aspect of the embodiments, the illuminating the imaging unit comprises a camera preferably CCD camera with IR filter and light source.

According to another aspect of the embodiments, the feature extraction unit and recognition unit comprises computing devices selected from a group comprising PDA, mobile phones, computers and other related devices.

In an exemplary embodiment of the invention provides a method to authenticate vein pattern. The method includes but not limiting to acts of pressing the detection button by placing hand in a hand placement unit to inform computing device about presence of a hand for processing; illuminating region of interest of the hand placed and capturing binarized image of the hand; extracting vascular pattern from the captured image for representing the pattern as line-segment-hypothesis and binarized image; merging the hypotheses together for representing in form a graph and computing the core segments and adjacency list from the graph; and comparing the extracted line-segment-hypothesis and binarized image with stored line-segment-hypothesis and binarized image to authenticate the vein pattern.

According to another aspect of the embodiments, the method of authentication comprise registration process comprising acts of; placing the hand in the hand placement unit and assigning unique identifier for each user; capturing the images of the hands preferably subcutaneous vein pattern at the back of the palm for predetermined number of times upon pressing detection button; computing prerequisite features from the captured image; matching the computed sample with previously obtained sample of same hand; and indexing the matched samples in the storage for authentication.

Another illustrative embodiment provides a method for extracting vascular pattern comprising acts of; extracting image of boundary of hand; applying local thresholding by comparing the image to predetermined median filtered image and storing thresholded image as binarized vein pattern; thinning the binarized vein pattern into single pixel thickness; computing core line segment from the thinned image; and computing merged segments from the core segments for extracting vascular pattern.

Another exemplary embodiment provides a method for comparing live pattern with recorded pattern comprising acts of computing distance between pluralities of line-segment-hypothesis, wherein the computing distance comprises steps of constructing a matrix with live patterns segment and recorded pattern segments; initializing cumulative hausdorff distance to zero; filling the matrix representing line segment hausdorff between predetermined segment (h) of the live pattern and the predetermined segment (k) of the recorded pattern; selecting the smallest element from the filled matrix and incrementing the hausdorff distance with the selected element; filling all the elements of row and columns of the matrix with positive and negative infinity respectively; and matching the predetermined segments (h and k) in the live pattern and recorded pattern respectively correspond to a merged segment to fill all the rows and columns corresponding to the core segments of h and k respectively with infinity.

According to another aspect of the embodiments, the method computes difference between hand widths in the live pattern and recorded pattern, if the difference is greater than a prescribed threshold then returns zero (0); difference between number of vein points in the live pattern and recorded pattern, if the difference is greater than a prescribed threshold then returns zero (0); and match between the binarized image of the live pattern and the recorded pattern, where the match is carried out using logical operation between the live pattern and the recorded pattern to determine ratio of number of white pixels in the patterns.

Vein patterns are invisible and virtually impossible to forge as they are inside the skin; this makes them system highly secure. The system can work even in case of sweaty or oily hands, making it suitable for factory environment and rural areas. It is not affected by the above mentioned problems with other biometrics.

The System is designed to capture the subcutaneous vein pattern at the back of the palm and use it as the biometric identity of a person. An imaging unit captures an infra-red image of the back of the palm which highlights the veins. The response of the imaging unit is such that it is unaffected by mehandi, few colours of ink, or sweat on the back of the palm.

An optical arrangement is designed in such a way that sensitivity of the image to external lighting (within certain limits) is minimal.

A hand placement unit it designed such that the user intuitively places his hand in a manner ideally suited for recognition. The system can detect whether the user has placed his left or right hand by the push of a button and use this information for recognition.

The feature extraction unit extracts differentiating parameters from the image into a pattern. The recognition unit verifies the identity claim by comparing the pattern with a pre-registered pattern of the same user stored in a database.

Aforesaid features are explained in detailed along with their constructional features and functional aspects.

A special hand placement unit has been designed which solves the limitations faced by the existing designs.

Figure 6A:
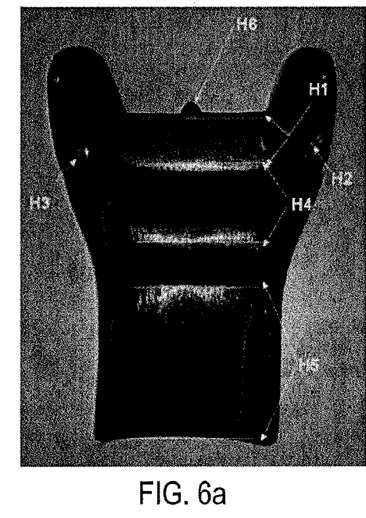
FIG. 6a shows the hand placement unit along with functional components.

The functional components of the hand placement unit in the above diagram are as follows H1. Portion to rest the flat (upper) portion of the palm.

H2. Button to be pressed by the thumb indicating left hand has been placed and the user is ready for biometric authentication.

Figure 6B:
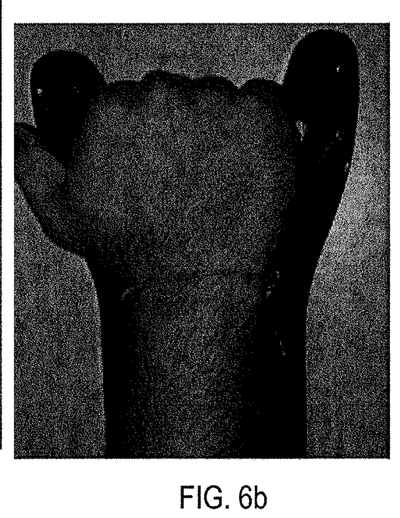
FIG. 6b shows hand placement unit when hand is placed.
Figure 7A:
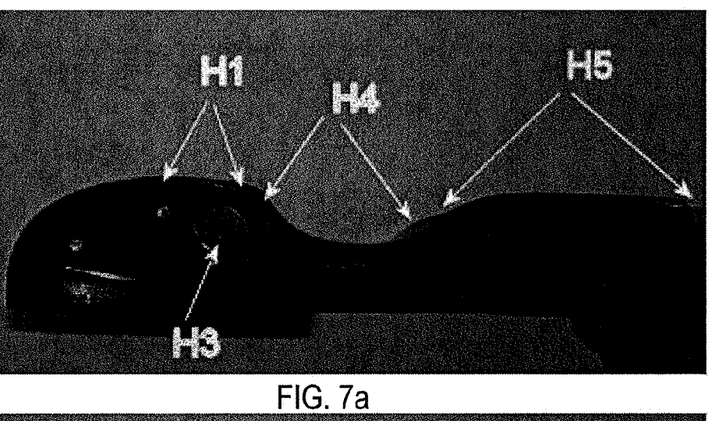
FIGS. 7a and 7b show a side view of the hand placement unit.
Figure 7B:
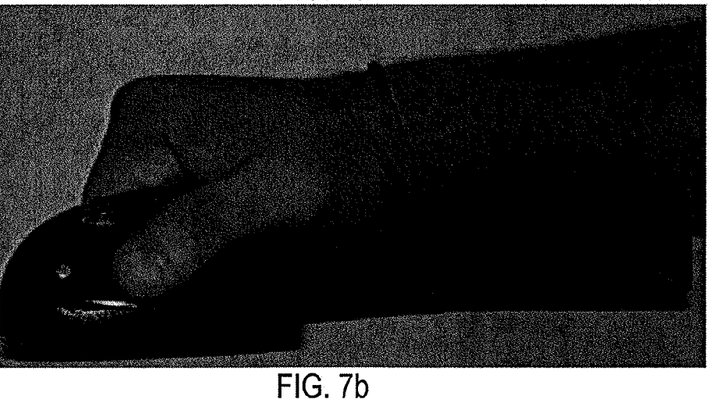
Figure 8A:
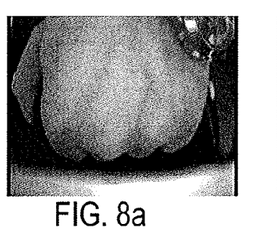
FIGS. 8a, 8b, and 8c show shows images taken when the users were not fully ready for authentication.
Figure 8B:
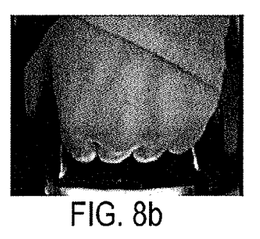
Figure 8C:
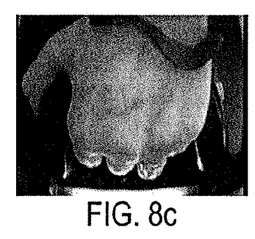

H3. Button to be pressed by the thumb indicating right hand has been placed and the user. is ready for biometric authentication H4. Portion to rest the fleshy (lower) part of the palm H5. Portion to rest/guide the wrist for comfort and alignment H6. Protrusion the fits between the middle finger and the ring finger Now we describe the purpose of each part, and how this design solves the problems shown in FIGS. 1a-1g. The combination of the flat portion H1 and the and the concavity H4 is designed in a such a way that when a hand is placed as shown in FIG. 6b and FIG. 7b, the interesting portion of the back of the palm is flat and parallel facing upwards (towards the imaging unit). The problems due to rotational freedom of the hand shown in FIGS. 1c, 1e, and 1d are thus solved. The protrusion H6 fits between the middle and the ring finger, for both left and right hands. This restricts the lateral movement as show in FIGS. 1a and 1b. Since this restricting element is in the center and not at the sides of the hand placement unit, it makes it equally comfortable for users of various hand sizes. The wrist guide H5 is designed to support the wrist. Since the wrist does not fall in the region of interest, it is not necessary that the user rest his wrist on this portion. This portion serves the purpose to guide the direction of the rest of the hand.

The buttons H2 and H3 serve a dual purpose. One is to indicate the readiness of the user. In prior art, the exact timing at which the capture and verification is performed is determined by the system and not by the user himself. The readiness factor is an important one in the context of the current biometric system. Some users wear bangles, loose wrist watches (clothing that falls on the region of interest) and tend to adjust them after placing the hand on the system. In such cases it is better to determine the exact timing of interest by a voluntary action of the user (like pressing a button when he is ready), as this considerably improves the accuracy of the system.

The other is to detect whether the right hand or left hand has been placed on the system. This enables the system to reduce the search space of vein patterns. In other words, only left hand patterns are matched when the button H2 is pressed, and only right hand patterns are matched when the button H3 is pressed.

U2: Illuminating and Imaging Unit

In the current system we have exploited the Auto-Iris effect of the CCD camera to obtain uniform illumination and contrast on the region of interest. Auto Iris Lenses adjust for changing light conditions. If the amount of light falling on the camera's lens increases, the lens will electronically reduce the aperture size so that effectively same amount of light reaches the sensor of the camera. Auto-Iris effect is nowadays a regular property for most of the CCD cameras which are used for outdoor purposes as it enables the camera to function effectively during daytime as well as night time.

It has been observed that when a bright object is placed the field view of view of an auto-iris camera, the remaining portion of the image appears with uniform brightness and contrast.

Figure 9A:
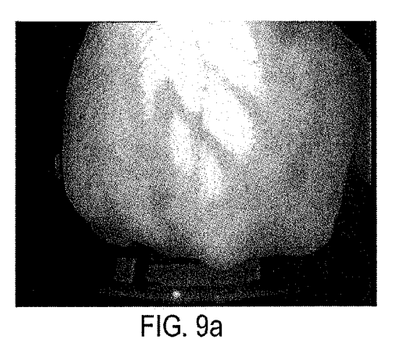
FIG. 9a shows bright patch on the portion of the hand closer to the wrist caused due to clipping.
Figure 9B:
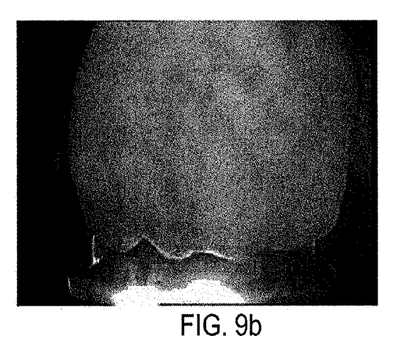
FIG. 9b shows external irradiating object is placed in the field of view of the camera
Figure 9C:
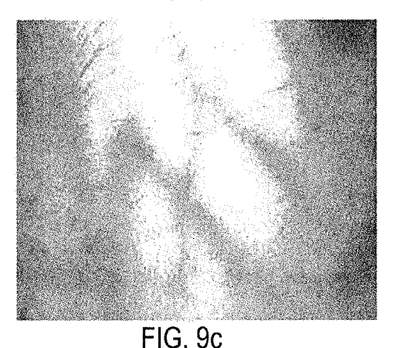
FIG. 9c shows an image taken without an external bright object.
Figure 9D:
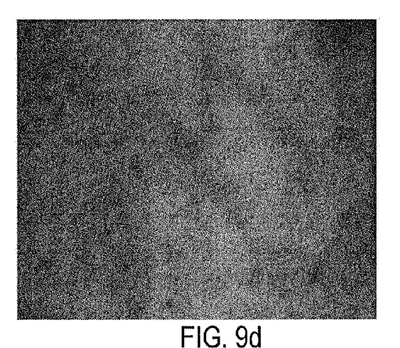
FIG. 9d shows an image taken with an external bright object.

This effect is illustrated in FIGS. 9a, 9b. In FIG. 9a, there is a bright patch on the portion of the hand closer to the wrist caused due to clipping. It can be seen that a portion of the vein pattern is hidden due to this bright patch of light. In FIG. 9b, an external IR irradiating object (light source) is placed in the field of view of the camera as can be seen in the lower portion of the image. Comparing the region of interest in FIGS. 9c, 9d it can be seen that the illumination and contrast of the image is more uniform in 9d.

How the auto iris effect of the ccd camera helps in obtaining uniform irradiation is illustrated with a one dimensional signal for simplicity.

Figure 10A:
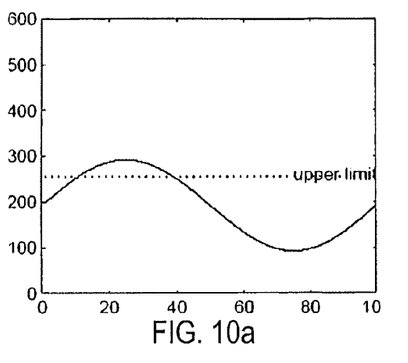
FIGS. 10a and 10c represent the signal reaching the lens.
Figure 10B:
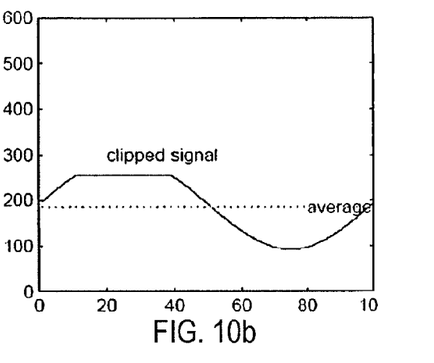
FIGS. 10b and 10d show the corresponding signal reaching the ccd sensor after passing through the aperture.
Figure 10C:
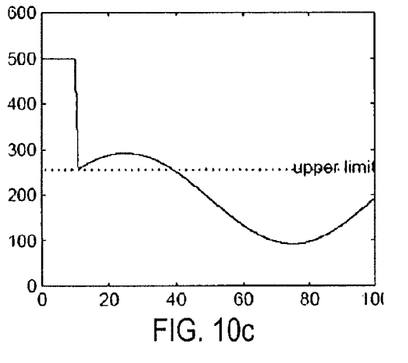
Figure 10D:
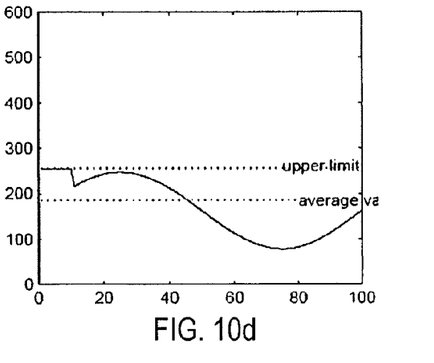

FIGS. 10a and 10c represent the signal reaching the lens, and FIGS. 10b and 10d show the corresponding signal reaching the ccd sensor after passing through the aperture. FIG. 10b represents the clipped signal. The portion of the signal in 10a which exceeds the upper-cutoff is clipped. This portion is seen as a bright patch in the image which occludes the vein pattern. When a bright object is introduced in the field of view of the camera, the signal reaching the lens looks like 10c. The auto-iris effect adjusts the aperture so that the mean of the signals remains same as in FIG. 10b, this is done by scaling down the whole signal until this mean of the signal was the same as in 10b. The resulting image is as shown in 10d, in which there is no clipping in the region of interest and hence no bright patches on the image.

U3 Feature Extraction

A method of representing the vein pattern as a binarized image is very fast, but it doesn't fully exploit the information in the vascular pattern connectivity and directionality. A method in which the vascular pattern is represented in geometric primitives is relatively slower, but results in better accuracy. We combine these two approaches and overcome the dilemma of multiple possibilities of geometric representation (shown in FIG. 4) using a novel approach.

The approach as disclosed in the present invention represents the vascular pattern as a graph of line-segment-hypothesis rather than a set of line-segments.

Figure 11:
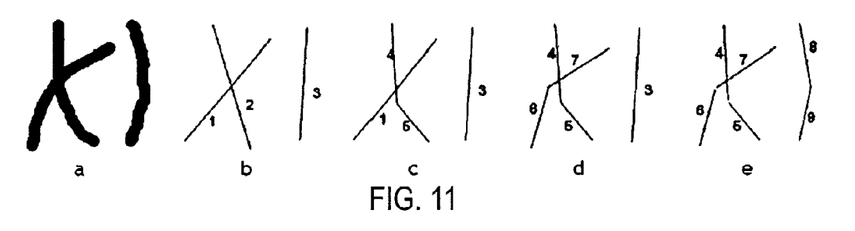
FIG. 11 shows various line-segment-hypothesis of the same image

In FIG. 11, multiple interpretations of the same image is represented in terms of line segments. The present approach in the current method is to utilize all hypotheses during recognition instead of selecting one of them based on some criteria. From the FIG. 11c, it is seen that the segment pair (4, 5) is an alternate interpretation of segment 2 in FIG. 11b. These hypotheses can be merged together and represented in the form of a graph where each node represents a single line-segment-hypothesis. If there is no path in the graph from node A to node B or from node B to node A, that means that A and B are alternate interpretations of each other.

Each path traversing from S to E in the above figure represents a possible interpretation of the binary image.

Figure 12:
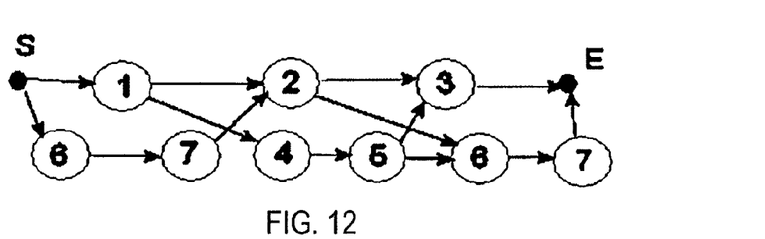
FIG. 12 shows graph representation of the line-segment-hypothesis.
Figure 13:
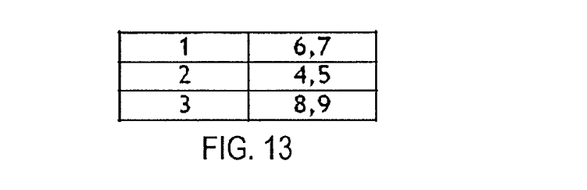
FIG. 13 shows tabular representation of line-segment-hypothesis.
Figure 14:
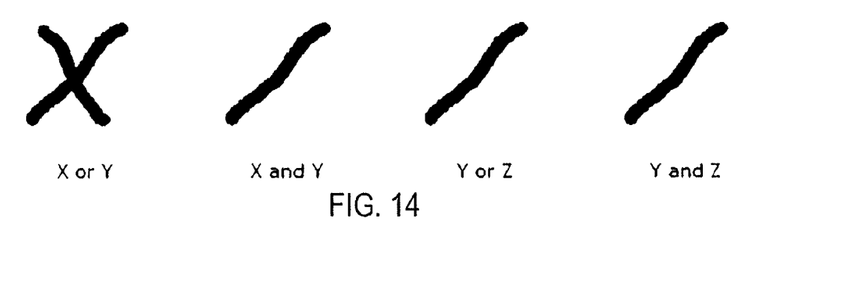
FIG. 14 shows multiple patterns "X or Y", "X and Y", "Y or Z", "Y and Z".

A hierarchical approach of representing the line segment hypotheses is in the form of core-segments and merged-segments. In the FIG. 12, it can be seen that segments 4, 5, 6, 7, 8, 9 cannot be split further, so these are designated as core segments. Segments 1, 2, 3 can be called as merged segments because segment 1 can be formed by merging segment 6 and 7. The representation is in the form of a table as shown in FIG. 13 which shows the relation between merged and core segments.

The detailed methodology for obtaining the line segment hypothesis from the binarized image is described later.

Unlike the prior art, the average width of the hand is also used as a feature to enable early rejection.

U4 Recognition

Figure 5:
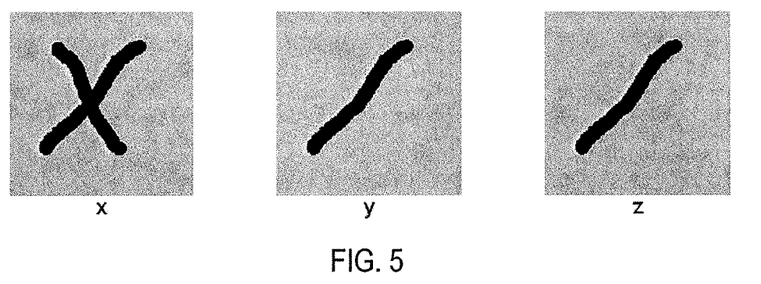
FIG. 5 shows multiple patterns x, y and z.

To avoid the flaws in prior art in comparing binary images, a new formula has been developed. If A is a binarized image of the live vein pattern, and B is the binarized image corresponding to the recorded vein pattern. Vein pixels are represented as 1 and non-vein pixels as 0. The matching distance is defined as $$F(A, B) = \frac{\text{Number of white pixels in } (A \text{ and } B)}{\text{Number of white pixels in } (A \text{ or } B)}$$

Where "and" and "or" are morphological operations on the binary image. When this formula is applied to compare the patterns y, z in FIG. 5, F(y,z)=1 and F(y,x) is around 0.5 which are the expected values.

A modified approach has been developed to the line-segment Hausdorff distance for computing distance between two different line-segment-hypotheses. This method is described in forthcoming specification.

In the recognition module distances are obtained from different methods are merged into a distance vector. This distance vector is then converted into a scalar value using linear discriminant analysis (LDA).

The computation of distances is ordered in time such that, the least time consuming distance is computed first and the most time consuming distance is computed at the end. This enables in early rejection in case any of the distance exceeds a prescribed threshold.

A broad level description of the registration and authentication process is as follows. A diagram describing the parts of the system is as provided in FIGS. 15a, 15b, and 15c.

Figures 15A, 15B:
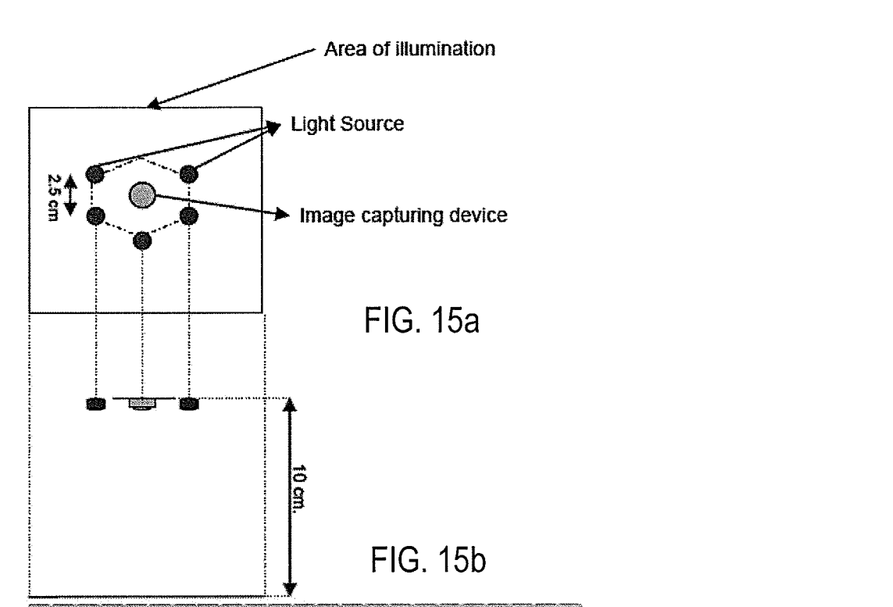
FIG. 15a shows a top view diagram of the system.
FIG. 15b shows a front view of diagram of the system.
Figure 15C:
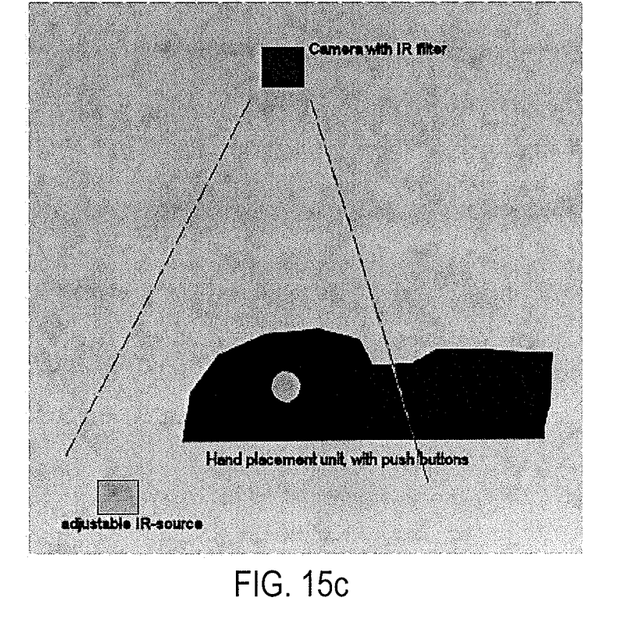
FIG. 15c shows a side view diagram of the system.
Figure 16:
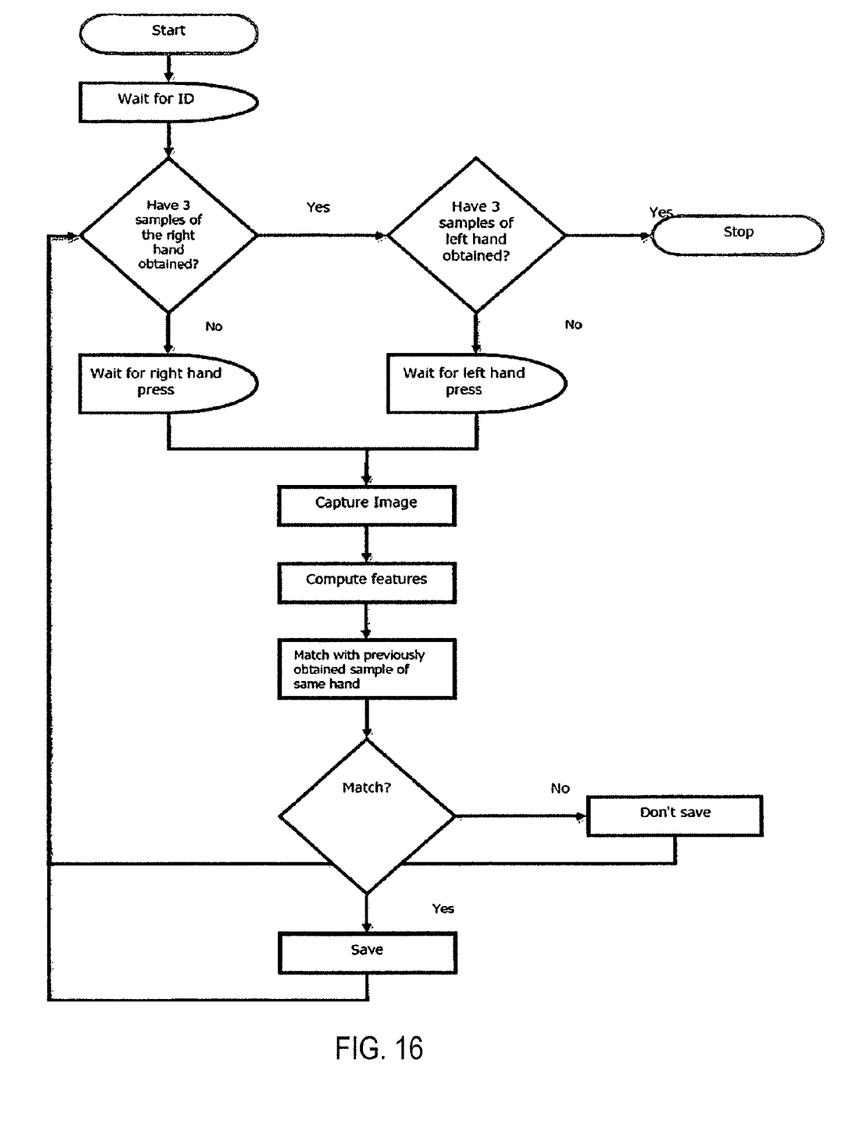
FIG. 16 shows flow chart of registration process.

FIGS. 15a, 15b and 15c shows the top view, front view and side view respectively of the image capturing part of the entire system. Top view shows the number and layout of LEDs that are used for uniform illumination. The LEDs are placed at 5 corners of a regular hexagon, leaving the topmost corner. At the centre of this hexagon is the image capturing camera the CCD camera. Front view shows the distance b/w camera and the object and also one dimension of the area of interest. Side view shows the field of view of the camera and the other dimension of the area of interest Registration The system obtains and stores three samples of each hand during registration process. The registration process flow chart is shown in FIG. 16.

During the registration process, each user is first assigned a user ID, once a user ID is assigned, system begins its biometric registration. During the registration process system needs to take 3 sample of each hand that is being registered. It takes sample of either hand alternately. Sample taking process involves capturing the image using the CCD camera. Once the image is captured it is then converted into bit pattern by using the feature extraction algorithm. This pattern is then stored. When second sample of same hand is taken, similar process is repeated, the new bit pattern is matched with the previously stored pattern, if there is no mismatch the system saves the second bit pattern and proceeds towards taking the third sample. In case there is a mismatch the system asks the user to retry. When the system takes the third sample it repeats the same process and compares with previously stored both bit patterns. This process is repeated for both hands.

Authentication

Figure 17:
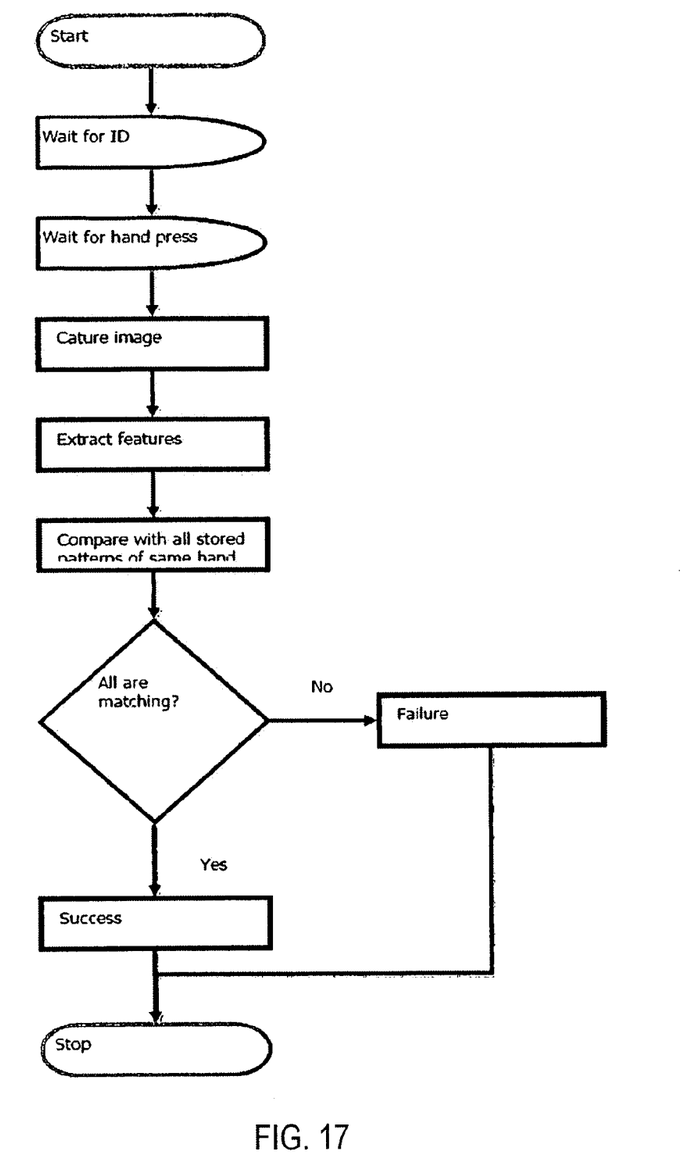
FIG. 17 shows flow chart of authentication process.

The current user makes a claim of being a claimed user. The system compares the pattern of the current user (live pattern) with the pattern of the claimed user (recorded pattern) and makes a decision as to whether they belong to the same user. The process flow chart is shown in FIG. 17.

Feature Extraction

Figure 18:
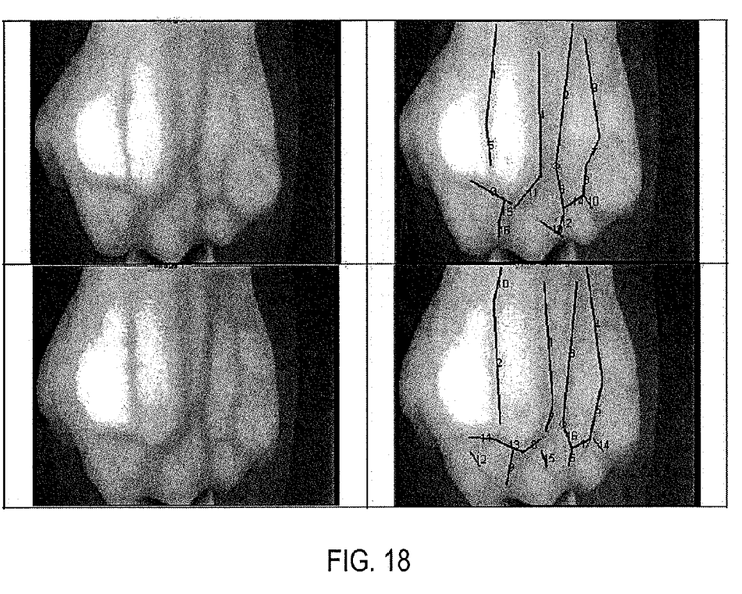
FIG. 18 shows hand images and corresponding core segments.

The steps involved in feature extraction are as follows
1. Extraction of the hand boundary
   (a) The Image is first resized from 720×576 pixels to a smaller size 128×160 to increase the speed of processing
   (b) The image undergoes median filtering with a mask of size 3×3 to avoid speckle noise from the camera. This image is stored in a 2D array A.
   (c) The background is kept black, hence even under IR radiation the hand appears brighter than the background. We compute a threshold to segment the hand region from the background using Otsu's method.
      i. Compute the Histogram H of the image for gray levels 0 t 255
      ii. For each i ranging from 1 to 254
         a) Compute the variance (V1) of the histogram for gray levels 0 to i−1
         b) Compute the variance (V2) of the histogram for gray levels i+1 to 255
         c) V(i)=V1+V2
      iii. Compute i for which V(i) is maximum. This is the separating gray level between the hand and the background
   (d) Threshold and binarize the image and store it in a 2d array H. This gives the hand-shape binarized image.
2. The image is such that the pixels corresponding to the vein pattern are darker than the neighboring pixels. Local thresholding is applied by comparing the image to a median filtered image.
   a Compute the Median filtered image of with mask of size 5×5 and save it in M.
   b For each row y and column x, If A(x,y)<M(x,y) then V(x,y)=255, else V(x,y)=0
   c Store the 2d array V as the binarized vein pattern
   d Store the number of vein pixels in a variable Nv.
3. Thinning the binarized vein pattern to single pixel thickness and stored it in a 2d array T.
4. Computing core line segment from the thinned Image
   a For each end point s on the thinned image.
      (i) Traverse along the thinned image, mark the point e
      (ii) If area enclosed by the thinned image and the and the straight line joining s and e is greater than a prescribed threshold $T_A$ then store the end points (s, e) as a core-segment (as shown FIG. 18) and shift s to e
      Else
      traverse to the next point along the thinned image
5. Computing merged segments from the core segments
   a. Criteria to merge two core segments is defined as $$C(i,j) = \sqrt{(E(i,j))^2 + W \cdot (A(i,j))^2}$$

Where E(i,j) is the end-to-end distance between two line segments. End-to-end distance between two line segments AC and BD is defined as $$E(AB,CD) = \min(l_{AC}, l_{AD}, l_{BC}, l_{CD})$$

A (i,j) is the angle between i and j. W is a pre-determined weight.
   b. The segment pairs with merging criteria lesser than a threshold are selected and merged into a single merged segment and stored as shown in a table as shown in FIG. 13. Merging is done by selecting the farthest points in the two line segments, and joining them to form a new line segment.

Recognition

The recognition module compares the features from the live and recorded pattern, and returns 0 indicating no match, or 1 indicating that there is a match.

1. Compute difference between hand widths in the live and recorded pattern. If the difference is greater than a prescribed threshold then return 0.
2. Compute difference between Number of vein points in the live pattern and recorded patten. If the difference is greater than a prescribed threshold then return 0.
3. Compute match between the binarized image of the live pattern and the recorded pattern, where A is the live pattern and B is the recorded pattern.

$$M = \frac{\text{Number of white pixels in } (A \text{ and } B)}{\text{Number of white pixels in } (A \text{ or } B)}$$

If M is lesser than a prescribed threshold, return 0

4. Compute the cumulative line segment hausdorff distance between the line segment hypothesis
   a. Construct a matrix HD with the live patterns segment along the rows, and the recorded pattern's segments along the column.
   b. Initialize the cumulative hausdorff distance CHD=0
   c. Fill the matrix with HD(i,j) representing the line segment hausdorff between segment i of the live pattern and segment j of the recorded pattern
   d. Select the smallest element in the matrix, say it corresponds to HD (h, k). Increment CHD with HD (h, k)
   e. Fill all the elements in row h with positive infinity
   f. Fill all the elements in column h with positive infinity
   g. If segment h in the live pattern corresponds to a merged segment, fill all the rows corresponding to the core segments of h with infinity
   h. If segment k in the recorded pattern corresponds to a merged segment, fill all the columns corresponding to the core segments of k with infinity
   i. Repeat from step d until all the elements in the matrix have been filled with infinity
   j. If CHD is greater than a prescribed threshold, then return 0 else return 1

We claim:

1. A vein pattern recognition based biometric system comprising
   i. a hand placement unit and a detection unit being configured to inform a computing device about the presence of a hand for processing; said hand placement unit comprises
      a portion to rest flat portion of the palm,
      a plurality of buttons to be pressed by thumb that indicate whether a left or right hand has been placed,
      a concavity to rest a fleshy part of the palm, and
      a portion to guide the wrist for alignment and a protrusion that separates the middle finger and the ring finger;
   ii. an illuminating and imaging unit that comprises a bright object placed in the field of view of the illuminating and imaging unit that illuminates a region of interest with uniformly diffused near-infrared light;
   iii. a feature extraction unit that extracts a vascular pattern from an image captured by the imaging device that represents the pattern as line-segment-hypothesis and binarized imagine; and
   iv. a recognition unit that compares the extracted line-segment-hypothesis and binarized image with a stored line-segment-hypothesis and binarized image to authenticate the vein pattern, by:
      constructing a matrix with live pattern segments and recorded pattern segments;
      initializing a cumulative hausdorff distance to zero;
      filling the matrix representing line segment hausdorff between predetermined segment (h) of the live pattern and the predetermined segment (k) of the recorded pattern;
      selecting the smallest element from the filled matrix and incrementing the hausdorff distance with the selected element;
      filling all the elements of row h and column k of the matrix with positive and negative infinity respectively; and
      checking if the predetermined segments (h and k) in the live pattern and recorded pattern, respectively, correspond to a merged segment, and if so, filling all the rows corresponding to the core segments of h and columns corresponding to the core segments of k, respectively, with infinity.

2. The system as claimed in claim 1, wherein the system is configured to capture subcutaneous vein pattern at the back of the palm.

3. The system as claimed in claim 1, wherein the illuminating and the imaging unit comprises a camera, and light source.

4. The system as claimed in claim 1, wherein the bright object is reflecting mirror or an LED light source.

5. The system as claimed in claim 1, wherein the feature extraction unit and recognition unit comprises computing devices selected from a group comprising embedded system, PDA, mobile phones, computers and other related devices.

6. A method to authenticate vein pattern, said method comprising acts of
   i. pressing the detection button by placing a hand in a hand placement unit to inform a computing device about the presence of a hand to allow it to automatically distinguish between right and left hands;
   ii. illuminating a region of interest of the hand placed and capturing a binarized image of the hand;
   iii. extracting a vascular pattern from the captured image for representing the pattern as a line-segment-hypothesis and binarized image;
   iv. computing core segments and merging them to form an additional line segment hypothesis;
   v. representing the line segment hypothesis in the form of a directed graph, where each node represents a line segment and there does not exist a path between two nodes if they have a common core segment; and
   vi. comparing the extracted line-segment-hypothesis and binarized image with a stored line-segment-hypothesis and binarized image to authenticate the vein pattern, said comparing comprising the steps of:
      constructing a matrix with live pattern segments and recorded pattern segments;
      initializing a cumulative hausdorff distance to zero;
      filling the matrix representing line segment hausdorff between predetermined segment (h) of the live pattern and the predetermined segment (k) of the recorded pattern;
      selecting the smallest element from the filled matrix and incrementing the hausdorff distance with the selected element;
      filling all the elements of row h and column k of the matrix with positive and negative infinity respectively; and
      checking if the predetermined segments (h and k) in the live pattern and recorded pattern respectively corresponds to a merged segment, and if so, filling all the rows corresponding to the core segments of h and columns corresponding to the core segments of k respectively with infinity.

7. The method as claimed in claim 6, wherein the method of authentication comprises registration process comprising acts of
   i. placing the hand in the hand placement unit and assigning unique identifier for each user;
   ii. capturing the images of the hands for predetermined number of times upon pressing detection button and converting the captured image into bit pattern;
   iii. computing prerequisite features from the captured image;
   iv. matching the computed sample with previously obtained sample or samples of same hand; and
   v. indexing the matched samples in the storage for authentication.

8. The method as claimed in claim 6, wherein the method computes:
   i. difference between hand widths in the live pattern and recorded pattern, if the difference is greater than a prescribed threshold then returns zero (0);
   ii. difference between number of vein points in the live pattern and recorded pattern, if the difference is greater than a prescribed threshold then returns zero (0); and
   iii. match between the binarized image of the live pattern and the recorded pattern, where the match is carried out using logical operation between the live pattern and the recorded pattern to determine ratio of number of white pixels in the patterns.

\* \* \* \* \*